United States Patent
Sheth et al.

(10) Patent No.: US 10,699,398 B2
(45) Date of Patent: Jun. 30, 2020

(54) DEEP LEARNING COORDINATE PREDICTION USING SATELLITE AND SERVICE DATA

(71) Applicant: Uber Technologies, Inc., San Francisco, CA (US)

(72) Inventors: Chandan Prakash Sheth, Fremont, CA (US); Minzhen Yi, Madison, WI (US); Livia Zarnescu Yanez, Menlo Park, CA (US); Sheng Yang, Fremont, CA (US); Shivendra Pratap Singh, Redwood City, CA (US); Alvin AuYoung, San Jose, CA (US); Vikram Saxena, Cupertino, CA (US)

(73) Assignee: Uber Technologies, Inc., San Francisco, CA (US)

( * ) Notice: Subject to any disclaimer, the term of this patent is extended or adjusted under 35 U.S.C. 154(b) by 14 days.

(21) Appl. No.: 16/021,317

(22) Filed: Jun. 28, 2018

(65) Prior Publication Data
US 2019/0180434 A1   Jun. 13, 2019

Related U.S. Application Data

(60) Provisional application No. 62/598,213, filed on Dec. 13, 2017.

(51) Int. Cl.
*H04W 4/024* (2018.01)
*G06F 16/29* (2019.01)
(Continued)

(52) U.S. Cl.
CPC ............ *G06T 7/0002* (2013.01); *G06F 16/29* (2019.01); *G06N 20/00* (2019.01); *H04W 4/024* (2018.02);
(Continued)

(58) Field of Classification Search
CPC combination set(s) only.
See application file for complete search history.

(56) References Cited

U.S. PATENT DOCUMENTS

| 7,072,863 B1 | 7/2006 | Phillips et al. |
| 8,560,236 B1 | 10/2013 | Rice et al. |
(Continued)

OTHER PUBLICATIONS

"Deep learning for satellite imagery via image segmentation", deepsense.ai Big Date Science, https://deepsense.ai/deep-learning-for-satellite-imagery-via-image-segmentation/ Accessed on Oct. 24, 2018, (Apr. 12, 2017), 43 pgs.
(Continued)

*Primary Examiner* — Omar S Ismail
(74) *Attorney, Agent, or Firm* — Schwegman Lundberg & Woessner, P.A.

(57) ABSTRACT

Systems and methods of deep learning coordinate prediction using satellite and service data are disclosed herein. In some example embodiments, for each one of a plurality of places, a computer system trains a deep learning model based on training data of the plurality of places. The deep leaning model is configured to generate a predicted geographical location of a place based on satellite image data and service data associated with the place. The training data for each place comprises satellite image data of the place, service data, and a ground truth geographical location of the place. The service data comprises at least one of pick-up data indicating a geographical location at which a provider started transporting a requester in servicing a request associated with the place or drop-off data indicating a geographical location at which the provider completed transporting the requester in servicing the request associated with the place.

20 Claims, 12 Drawing Sheets

(51) Int. Cl.
  *G06T 7/00* (2017.01)
  *G06N 20/00* (2019.01)
  *H04W 4/029* (2018.01)

(52) U.S. Cl.
  CPC ... *H04W 4/029* (2018.02); *G06T 2207/10032* (2013.01)

(56) References Cited

U.S. PATENT DOCUMENTS

| | | | |
|---|---|---|---|
| 8,751,427 | B1 | 6/2014 | Mysen et al. |
| 2017/0193390 | A1* | 7/2017 | Weston ............... G06N 20/00 |
| 2017/0243400 | A1* | 8/2017 | Skidmore .......... G02B 27/0172 |
| 2018/0025235 | A1* | 1/2018 | Fridman ............ G06K 9/00791 382/103 |
| 2018/0197071 | A1* | 7/2018 | Dong ................... G08G 1/202 |
| 2018/0310135 | A1* | 10/2018 | Cirit ..................... G08G 1/205 |
| 2019/0145779 | A1 | 5/2019 | Li et al. |
| 2019/0171943 | A1* | 6/2019 | Pao ..................... G06F 16/338 |

OTHER PUBLICATIONS

Liang, Xiaodan, et al., "Human Parsing with Contextualized Convolutional Neural Network", CVF Computer Vision Foundation, (Dec. 12, 2016), 9 pgs.

Oquab, Maxime, et al., "Is object localization for free?—Weakly-supervised learning with convolutional neural networks", CVF Computer Vision Foundation, (2015), 685-694.

Shelhamer, Evan, "Fully Convolutional Networks for Semantic Segmentation", arXiv:1605.06211v1 [cs.CV], (May 20, 2016), 12 pgs.

"Multivariate kernel density estimation", Wikipedia, Retrieved from Internet https: en.wikipedia.org wiki Multivariate_kernel_density_estimation on Nov. 8, 2018, (accessed Nov. 8, 2018), 10 pgs.

"U.S. Appl. No. 15/859,422, Non Final Office Action dated Feb. 24, 2020".

* cited by examiner

| PLACE | SATELLITE DATA | SERVICE DATA | CATEGORY |
|---|---|---|---|
| ACME CORP. | IMAGE-1 | PICK-UP-1 | SHOPPING |
| | | DROP-OFF-2 | |
| | IMAGE-2 | DROP-OFF-3 | |
| | | DROP-OFF-4 | |
| | ... | ... | |
| WAYNE ENTERPRISES | IMAGE-3 | PICK-UP-19 | TRAVEL AUTOMOTIVE |
| | IMAGE-4 | PICK-UP-20 | |
| | ... | ... | ... |

DEEP LEARNING COORDINATE PREDICTION USING SATELLITE AND SERVICE DATA

CROSS-REFERENCE TO RELATED APPLICATIONS

This application claims the benefit of priority, under 35 U.S.C. Section 119(e), to U.S. Provisional Application No. 62/598,213, filed on Dec. 13, 2017, entitled, "DEEP LEARNING COORDINATE PREDICTION USING SATELLITE AND SERVICE DATA", which is hereby incorporated by reference in its entirety as if set forth herein.

TECHNICAL FIELD

Embodiments of the present disclosure relate generally to the technical field of geographic positioning for a networked computer system and, more particularly, but not by way of limitation, to systems and methods of deep learning coordinate prediction using satellite and service data.

BACKGROUND

A networked computer system can receive, from user devices, a request for a service. The request can include data related to a place that is to be involved in providing the service. For example, a user may submit a request, via the networked computer system, to be transported from a first place to a second place. The networked computer system may then transmit a geographical location of the first place and a geographical location of the second place to a device of a service provider for use in providing the service to the requester. However, although the request may include an identification of a place, the networked computer system may not have the corresponding geographical location of the place readily available. Additionally, current networked computer systems suffer from poor accuracy in predicting the actual geographical location of a place for which a user is requesting the service. For example, even though a request may include an address or a name of a place for which an address can be determined, the address of a place often does not accurately represent the precise location where the service should be provided.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 5 illustrates a mapping of corresponding data for different places, in accordance with some example embodiments.

DETAILED DESCRIPTION

Figure 1:
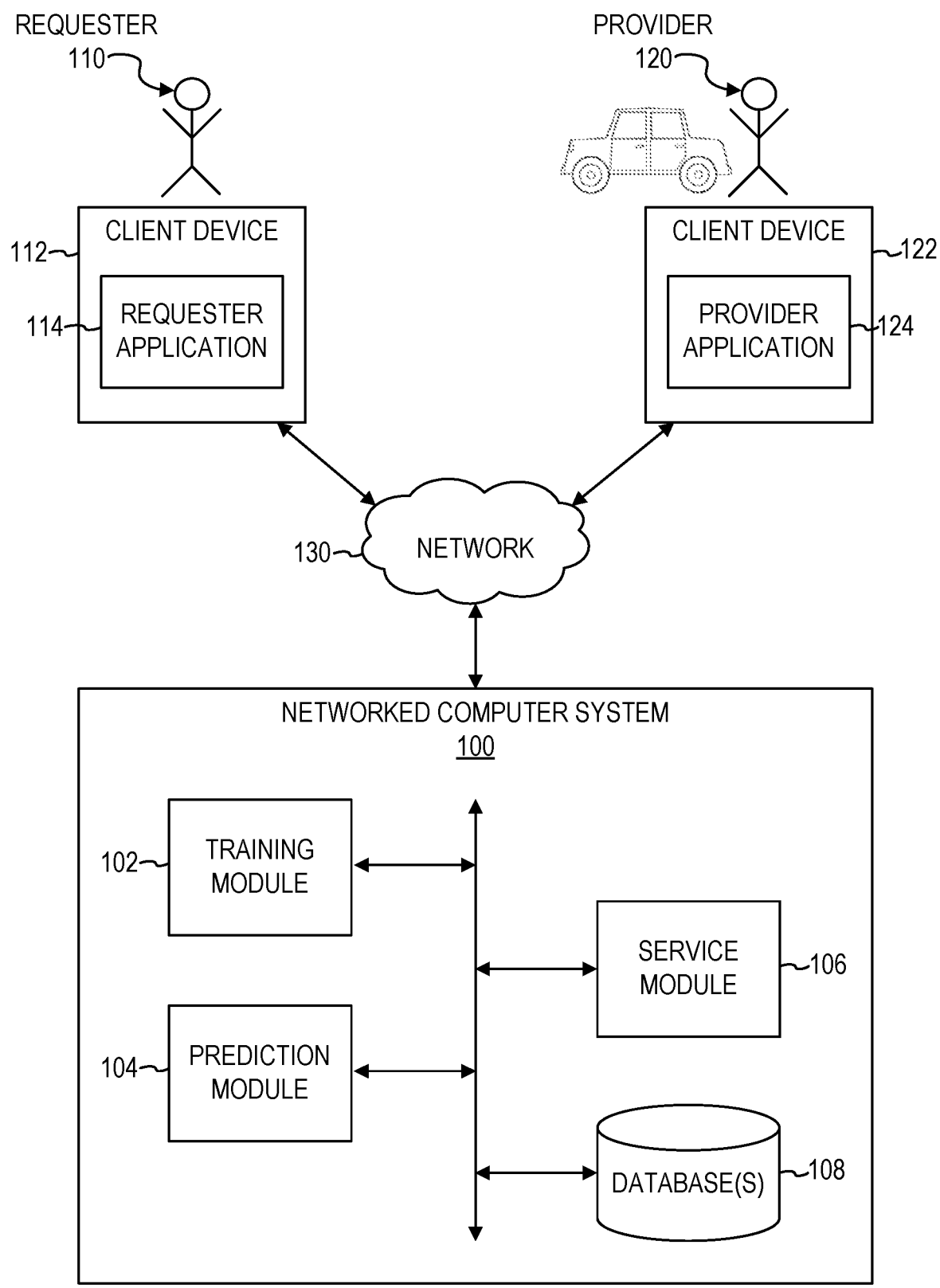
FIG. 1 is a block diagram of a system environment for a networked computer system, in accordance with some example embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The present disclosure provides technical solutions for improving the accuracy of computer-implemented coordinate prediction. In some example embodiments, a technical solution involves training a deep learning model on training data that includes satellite image data and service data, such as pick-up data and drop-off data, for use in generating predicted geographical locations of places. The training data is for places for which a ground truth geographical location of each of the places is already known. After the deep learning model has been trained on this training data, the deep learning model can then be used to generate a predicted geographical location of another place for which the geographical location is not known. Additionally, multiple deep learning models may be trained, and each one of the multiple trained deep learning models may then be used to generate a corresponding preliminary predicted geographical location for a place. The predicted geographical location for the place may then be determined based on the multiple preliminary predicted geographical locations for the place, thereby reducing the likelihood of inaccuracy that may plague a single deep learning model. The predicted geographical location may be determined based on the most common (e.g., the statistical mode) preliminary predicted geographical location, on an average of the preliminary predicted geographical locations, or on some other aspect or analysis of the multiple preliminary predicted geographical locations. One technical effect of the system and method of the present disclosure is to improve the accuracy of coordinate prediction by networked computer systems. Additionally, other technical effects will be apparent from this disclosure as well.

In some example embodiments, operations are performed by a computer system (or other machine) having a memory and at least one hardware processor, with the operations comprising: for each one of a plurality of places, receiving training data associated with the place, the training data comprising satellite image data of the place, service data, and a ground truth geographical location of the place, the service data comprising at least one of pick-up data and drop-off data, the pick-up data indicating a geographical location at which a provider started transporting a requester in servicing a request associated with the place, the drop-off data indicating a geographical location at which the provider completed transporting the requester in servicing the request associated with the place; training a deep learning model based on the training data of the plurality of places, the deep leaning model configured to generate a predicted geographical location of a place based on satellite image data and service data associated with the place; receiving satellite image data and service data for another place not included in the plurality of places, the service data for the other place comprising at least one of pick-up data and drop-off data, the pick-up data of the other place indicating a geographical location at which a provider started transporting a requester in servicing a request associated with the other place, the drop-off data of the other place indicating a geographical location at which the provider completed transporting the requester in servicing a request associated with the other place; and generating a predicted geographical location of the other place using the deep learning model based on the received satellite image data and the service data for the other place.

In some example embodiments, the operations further comprise: storing the predicted geographical location of the other place in a database in association with an identification of the other place; receiving a request for a service associated with the other place from a computing device of a requester, the request comprising the identification of the other place; identifying the predicted geographical location of the other place based on a search of the database using the identification of the other place; and transmitting the predicted geographical location of the other place to a computing device of a provider of the service of the request.

In some example embodiments, the service data of the training data comprises a geocode, the service data for the other place comprises a geocode, and the predicted geographical location of the other place comprises a geocode.

In some example embodiments, the deep learning model is trained using a convolutional neural network.

In some example embodiments, the service data of the training data comprises global positioning system (GPS) data of a mobile device of the provider corresponding to the request corresponding to the service data of the training data; and the service data for the other place comprises GPS data of a mobile device of the provider corresponding to the request corresponding to the service data for the other place.

In some example embodiments, the predicted geographical location of the other place comprises a subsection of the satellite image data of the other place.

In some example embodiments, the training of the deep learning model comprises: for each one of the plurality of places, generating integrated data by superimposing indications of the corresponding service data on the corresponding satellite image data; and training the deep learning model using the integrated data.

In some example embodiments, the training of the deep learning model comprises, for each one of the plurality of places, passing the corresponding satellite image data to the deep learning model separately from the corresponding service data.

In some example embodiments, the training of the deep learning model comprises training a plurality of deep learning models based on the training data of the plurality of places, and the generating the predicted geographical location of the other place comprises: for each one of the plurality of deep learning models, generating a preliminary predicted geographical location of the other place using the one of the deep learning model based on the received satellite image data and the service data for the other place; and determining the predicted geographical location based on the preliminary predicted geographical locations generated using the plurality of models. In some example embodiments, the determining the predicted geographical location comprises selecting the preliminary predicted geographical location that is most common among the preliminary predicted geographical locations generated using the plurality of models. In some example embodiments, the determining the predicted geographical location comprises determining an average of the preliminary predicted geographical locations generated using the plurality of models.

In some example embodiments, the operations further comprise: identifying a single category of places to which all of the plurality of places belong; and selecting the deep learning model from a plurality of deep learning models for use in the training of the deep learning model based on the identifying of the single category. In some example embodiments, the operations further comprise: identifying a category of places to which the other place belongs; and selecting the deep learning model for use in the generating of the predicted geographical location of the other place based on the identifying of the category.

In some example embodiments, for each one of the plurality of places, the use of the training data of the place in the training of the deep learning model is based on a determination that an amount of the service data of the training data of the place satisfies a minimum threshold amount.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and advantages of the subject matter described herein will be apparent from the description and drawings, and from the claims.

FIG. 1 is a block diagram of a system environment for a networked computer system 100, in accordance with some example embodiments. In some example embodiments, the networked computer system 100 coordinates transportation of persons and/or goods/items for a service requester 110 (e.g., a rider) by a service provider 120 (e.g., a driver of a vehicle). The provider 120 uses a vehicle to provide the transportation to the requester 110.

In some example embodiments, the networked computer system 100 comprises any combination of one or more of a training module 102, a prediction module 104, a service module 106, and one or more databases 108. These modules and databases are not native components of a generic computer system, and provide structures and functions beyond generic functions of a computer system, as further described below.

In some example embodiments, the modules 102, 104, and 106 and the database(s) 108 reside on a machine having a memory and at least one processor (not shown). In some example embodiments, the modules 102, 104, and 106 and the database(s) 108 reside on the same machine, while in other example embodiments, one or more of the modules 102, 104, and 106 and the database(s) 108 reside on separate remote machines that communicate with each other via a network (e.g., a network 130). It is contemplated that other configurations are also within the scope of the present disclosure.

In some example embodiments, the requester 110 operates a client device 112 that executes a requester application 114 that communicates with the networked computer system 100. The requester 110 operates the requester application 114 to view information about the networked computer system 100, and to make a request for service from the networked computer system 100 for a delivery or transport service ("a trip") of the requester 110 (and, optionally, additional persons) and/or items (e.g., cargo) needing transport. The requester application 114 determines a pick-up location within an origin location or enables the requester 110 to specify a pick-up location and/or a destination location associated with the trip. An origin location and/or a destination location may be a location inputted by the requester 110 or may correspond to the current location of the requester client device 112 as determined automatically by a location determination module (not shown) in the requester client device 112, such as a global positioning system (GPS) component, a wireless networking system, or a combination thereof. For purposes of simplicity, as described herein, the origin location can include a pick-up location for service (i) determined by the requester application 114 (e.g., based on the current location of the requester client device 112 using a GPS component), (ii) specified or selected by the requester 110, or (iii) determined by the networked computer system 100. In some embodiments, the networked computer system 100 recommends the pick-up location to the requester 110 based on historical trip data associated with the origin location.

According to examples herein, the requester client device 112 transmits a set of data to the networked computer system 100 over a network 130 in response to requester 110 input or operation of the requester application 114. Such data can be indicative of the requester's interest in potentially requesting service (e.g., before actually confirming or requesting the service). For example, the requester 110 may launch the requester application 114 and specify an origin location and/or a destination location to view information from the networked computer system 100 before making a decision on whether to request service. The requester 110 may want to view information about the average or estimated time of arrival for pick up by the provider 120, an estimated time to the destination, a corresponding cost, available service types, etc. Depending on implementation, the data can include the origin and/or destination location information, requester information (e.g., identifier), application information (e.g., version number), device identifier or type, etc. According to some examples, each time the requester 110 modifies the origin and/or destination location, the requester application 114 generates and transmits the data to the networked computer system 100.

The network 130 may be any network that enables communication between or among machines, databases, and devices (e.g., the networked computer system 100 and the client devices 112 and 122). Accordingly, the network 130 may be a wired network, a wireless network (e.g., a mobile or cellular network), or any suitable combination thereof. The network 130 may include one or more portions that constitute a private network, a public network (e.g., the Internet), or any suitable combination thereof. Accordingly, the network 130 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or a WiMax network), or any suitable combination thereof. Any one or more portions of the network 130 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Once the requester 110 confirms or orders a service via the requester application 114, the requester application 114 generates data corresponding to a request for the service through the networked computer system 100 (e.g., also referred to herein as a "trip request"). In response to receiving a trip request, the networked computer system 100 determines the average estimated time of arrival (ETA) at the pick-up location of providers 120 whose current location are within a threshold distance of the pick-up location (e.g., providers 120 who are all within one mile of the pickup location). In some embodiments, in response to determining that the requester's ETA at the pick-up location is within a threshold amount of time of the average ETA of nearby available providers 120, the networked computer system 100 uses information from the trip request to match the requester 110 with an available provider 120. Depending on implementation, the trip request can include requester 110 or device information (e.g., a requester identifier, a device identifier), a service type (e.g., vehicle type), and/or selected service option (such as described herein), an origin location, a destination location, a payment profile identifier, a desired departure time, and/or other data. The networked computer system 100 selects the provider 120 from a set of providers, such as based on the provider's current location and status (e.g., offline, online, available) and/or information from the trip request (e.g., service type, origin location, and/or destination location), to provide the service for the requester 110 and transport the requester 110 from the origin location to the destination location. In response to selecting an available provider 120, the networked computer system 100 sends an invitation message to the provider client device 122 inviting the provider 120 to fulfill the trip request.

In one example embodiment, the networked computer system 100 periodically determines the requester's ETA at the pick-up location based on the topological and geospatial location of the requester client device 112. In some example embodiments, the networked computer system 100 selects the provider 120 based on a comparison of the requester's ETA and the provider's ETA at the pick-up location. For example, if the networked computer system 100 determines that the requester 110 is about three minutes away from the pick-up location, the networked computer system 100 might select a provider 120 who is also about three minutes away even if other providers 120 have a shorter ETA.

If, after matching the requester 110 with the available provider 120, the networked computer system 100 determines that the requester's ETA and the provider's ETA at the pick-up location vary by over a threshold amount of time, the networked computer system 100 can reassign the trip to another available provider 120.

The provider 120 operates a client device 122 executing a provider application 124 that communicates with the networked computer system 100 to provide information indicating whether the provider 120 is available or unavailable to provide transportation services to requesters 110. The provider application 124 also presents information about the networked computer system 100 to the provider 120, such as invitations to provide service, navigation instructions, map data, etc. In one example embodiment, the provider application 124 enables the provider 120 to provide information regarding availability of the provider 120 by logging into the networked computer system 100 and activating a setting indicating that the provider 120 is currently available to provide service. The provider application 124 also provides the current location of the provider 120 or the provider client device 122 to the networked computer system 100. Depending on implementation, the current location may be a location inputted by the provider 120 or may correspond to the current location of the provider client device 122 as determined automatically by a location determination module (not shown) in the provider client device 122, for example, a GPS component, a wireless networking system, or a combination thereof. The provider application 124 further allows the provider 120 to receive, from the networked computer system 100, an invitation message to provide a service for the requesting requester 110, and if the provider 120 accepts, the provider application 124 transmits an acceptance message to the networked computer system 100. The networked computer system 100 can subsequently provide information about the provider 120 to the requester application 114. In another example embodiment, the provider application 124 can enable the provider 120 to view a list of current trip requests and to select a particular trip request to fulfill. The provider application 124 can also receive routing information from the networked computer system 100.

In some example embodiments, the requester client device 112 and provider client device 122 are portable electronic devices such as smartphones, tablet devices, wearable computing devices (e.g., smartwatches), or similar devices. Alternatively, the provider client device 122 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDPA, etc.), and location determination capabilities. The requester client device 112 and the provider client device 122 interact with the networked computer system 100 through client applications configured to interact with the networked computer system 100. The applications 114 and 124 of the requester client device 112 and the provider client device 122, respectively, present information received from the networked computer system 100 on a requester interface, such as a map of the geographic region, and the current location of the requester client device 112 or the provider client device 122. The applications 114 and 124 running on the requester client device 112 and the provider client device 124 can determine the current location of the respective device and provide the current location to the networked computer system 100.

The networked computer system 100 is configured to provide a communicative interface between the requester application 114, the provider application 124, and the various modules and databases in the networked computer system 100. The networked computer system 100 is configured to receive provider availability status information and current location information from the provider application 124 and update the database(s) 108 with the availability status. The networked computer system 100 is also configured to receive trip requests from the requester application 114 and create corresponding trip records in the database(s) 108. According to an example embodiment, a trip record corresponding to a trip request can include or be associated with a trip ID, a requester ID, an origin location, a destination location, a service type, pricing information, and/or a status indicating that the corresponding trip request has not been processed. According to one example embodiment, when the provider 120 accepts the invitation message to service the trip request for the requester 110, the trip record can be updated with the provider's information as well as the provider's location and the time when the trip request was accepted. Similarly, location and time information about the service as well as the cost for the service can be associated with the trip record.

In one example embodiment, during the trip, the networked computer system 100 receives information (e.g., periodically) from the provider application 124 indicating the location of the provider's vehicle and/or telematics information (e.g., indications of current speed, acceleration/deceleration, events, stops, and so forth). The networked computer system 100 stores the information in the database (s) 108 and can associate the information with the trip record. In some example embodiments, the networked computer system 100 periodically calculates the provider's ETA at the pick-up location and provides the provider's ETA to the requester application 114.

The networked computer system 100 determines the geospatial and topological location of the requester client device 112 in response to the requester 110 making a trip request through the requester application 114. In one example embodiment, the requester application 114 periodically transmits geospatial location information of the requester client device 112 to the networked computer system 100. The geospatial location information can correspond to a current location data point of the requester client device 112 at an instance in time. Such a location data point can be generated by a location determination module (not shown) in the requester client device 112, such as, for example, a GPS component, a wireless networking system, or a combination thereof.

In some example embodiments, the requester application 114 and the provider application 124 are configured to display map data indicating a specific geographical location of a place, as well as navigation instructions for the requester 110 using the requester application 114 on how to navigate (e.g., walk) to the specific geographical location of the place and navigation instructions for the provider 120 using the provider application 124 on how to navigate (e.g., drive) to the specific geographical location of the place. For example, the provider application 124 may display, on the client device 122 of the provider 120, a map that includes a graphic element that corresponds to the current location of the provider 120 or the client device 122 of the provider 120 and a graphic element that corresponds to the specific geographical location of a place associated with a service request, such as a place to pick up or drop off the requester 110 associated with the service request, as well as a route from the current location of the provider 120 or the client device 122 of the provider 120 to the specific geographical location of the place associated with the service request. Similarly, the requester application 114 may display, on the client device 112 of the requester 110, a map that includes a graphic element that corresponds to the current location of the requester 110 or the client device 112 of the requester 110 and a graphic element that corresponds to the specific geographical location of the place associated with the service request, as well as a route from the current location of the requester 110 or the client device 112 of the requester 110 to the specific geographical location of the place associated with the service request.

The map data and the navigation instructions are generated based on the specific geographical location of the place associated with the service request. In some example embodiments, the corresponding map data and navigation instructions are generated by the requester application 114 and the provider application 124 using the geographical location of the place, which is received by the requester application 114 and the provider application 124 from the networked computer system 100. For example, the networked computer system 100 may store the geographical location of the place in association with an identifier of the place (e.g., a name of the place, an address of the place) in the database(s) 108, and then transmit the geographical location of the place to the requester application 114 and the provider application 124 for use in generating the corresponding map data and navigation instructions that are to be generated and displayed by the requester application 114 and the provider application 124. In other example embodiments, the corresponding map data and navigation instructions are generated by the networked computer system 100 using the geographical location of the place stored in the database(s) 108 of the networked computer system 100 in association with an identifier of the place (e.g., a name of the place, an address of the place), and then transmitted to the requester application 114 and the provider application 124 for display on the client device 112 of the requester 110 and the client device 122 of the provider 120.

In some example embodiments, the geographical location of a place comprises a geocode. A geocode comprises a spatial representation in numerical coordinates, such as latitude and longitude, of a physical location (e.g., a physical address). Other types of representations of a physical location may additionally or alternatively be used as the geographical location in providing the features disclosed herein.

In some example embodiments, the training module 102 is configured to, for each one of a plurality of places, receive training data associated with the place. The training data may comprise one or more of satellite image data of the place, service data associated with the place, and a ground truth geographical location of the place. The satellite image data comprises one or more images of the Earth that are collected by imaging satellites, such as those satellites operated by governments or businesses. In some example embodiments, each image of the satellite image data is focused on a particular section of the Earth. For example, the image of the satellite image data may be limited to a 10-meter by 10-meter section of the Earth. The satellite image data may comprise multiple images of different sections of the Earth corresponding to the place with which the satellite image data is associated, such as a plurality of different 10-meter by 10-meter sections encompassing the place.

In some example embodiments, the service data comprises at least one of pick-up data and drop-off data. The pick-up data indicates a geographical location at which a provider started transporting a requester in servicing a request associated with the place. For example, the pick-up data for a place may comprise geocodes of geographical locations at which different providers started transporting different requesters in servicing requests associated with the place. The drop-off data indicates a geographical location at which the provider completed transporting the requester in servicing the request associated with the place. For example, the drop-off data for a place may comprise geocodes of geographical locations at which different providers completed transporting different requesters in servicing requests associated with the place. The pick-up data and drop-off data may comprise all of the pick-up data and drop-off data that are associated with requests that correspond to a particular time period. For example, the pick-up data and drop-off data may be limited to the pick-up data and drop-off data associated with requests that have been received and for which service has been completed within the last N months, where N is an integer, thereby ensuring that only recent relevant pick-up data and drop-off data is being used.

In some example embodiments, the satellite image data of a place and the service data of the place are stored in the database(s) 108 in association with an identification of the place. The indications of the corresponding service data of a place may be superimposed on the corresponding satellite image data of the place, thereby generating integrated data comprising both the satellite image data and the service data to be used in the training of the deep learning model(s). Additionally or alternatively, the corresponding satellite image data may be passed to the deep learning model(s) separately from the corresponding service data.

Figure 2:
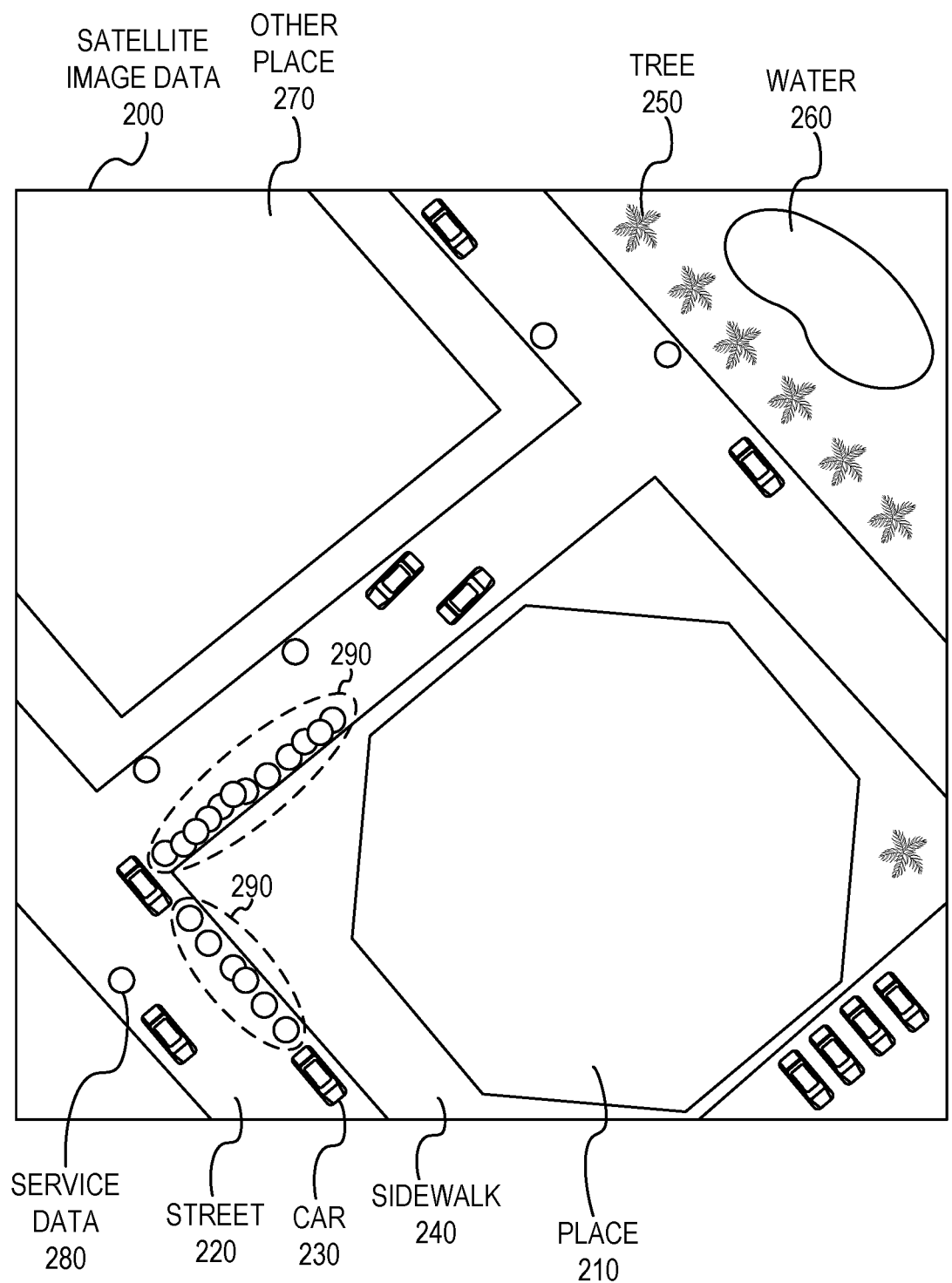
FIG. 2 illustrates satellite image data of a place, in accordance with some example embodiments.

FIG. 2 illustrates satellite image data 200 of a place, in accordance with some example embodiments. In FIG. 2, the satellite image data 200 comprises an indication, such as a graphical element, of the place 210, as well as environmental features surrounding a place 210. Such environmental features may include, but are not limited to, streets 220 and other pathways on which vehicles may travel, cars and other vehicles 230, sidewalks 240, trees 250 and other vegetation, bodies of water 260 (e.g., ponds and lakes), and other places 270 (e.g., buildings and other structures).

In FIG. 2, indications (e.g., graphic elements shown as circles) of a corresponding service data 280 of the place 210 have been superimposed on the satellite image data 200 of the place 210. The indication(s) of the corresponding service data 280 of the place 210 may comprise indications of geographical locations at which requesters 110 have been picked up and dropped off in association with service requests corresponding to the place 210. As seen in FIG. 2, a single place 210 may have many different pick-up locations and drop-off locations associated with it. Although a street address of the place 210 may provide an indication of a geographical location of the place 210, an analysis of the pick-up locations and drop-off locations for the place 210 provide a more precise and relevant geographical location of the place 210 for the purposes of computer-implemented navigation applications than a geographical location based on only the street address of the place. In FIG. 2, clusters 290 of indications of service data 280 indicate the most precise and relevant geographical location of the place 210 for the purposes of navigation applications.

In some example embodiments, the pick-up data of the service data corresponds to geographical locations of the client device 122 of the provider 120 when the provider 120 indicates, via the provider application 124 on the client device 122, that the provider 120 has started transporting the requester 110 in servicing a request associated with the place 210 (e.g., the provider 120 has picked up the requester 110 at the place 210). Similarly, in some example embodiments, the drop-off data of the service data corresponds to geographical locations of the client device 122 of the provider 120 when the provider 120 indicates, via the provider application 124 on the client device 122, that the provider 120 has completed transporting the requester 110 in servicing a request associated with the place 210 (e.g., the provider 120 has dropped off the requester 110 at the place 210).

Figure 3:
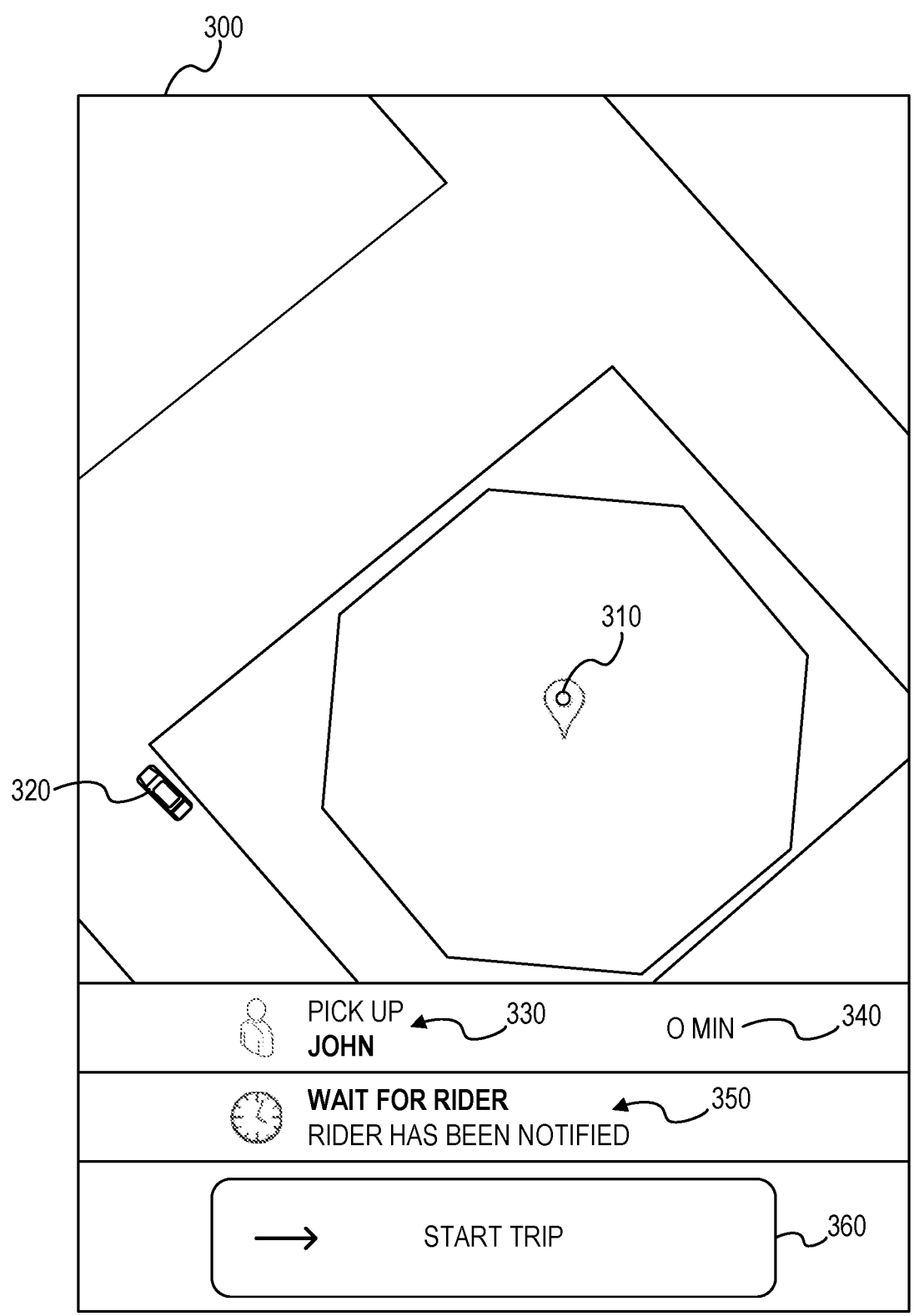
FIG. 3 illustrates a graphical user interface (GUI) in which a provider of a service may signal that the provider has started transporting a requester, in accordance with some example embodiments.

FIG. 3 illustrates a graphical user interface (GUI) 300 in which the provider 120 of a service signals that the provider 120 has started transporting the requester 110, in accordance with some example embodiments. The GUI 300 may be generated by the provider application 124 and display an indication 310 of the geographical location of the place and an indication 320 of the geographical location of the provider 120 or the client device 122 of the provider 120. The GUI 300 may also display supplemental information, such as an identification 330 of a requester 110 to be picked up by the provider 120, an indication 340 of an amount of time until the provider 120 or the client device 122 of the provider 120 arrives at the pick-up location, and an indication 350 that the requester 110 has been notified that the provider 120 has arrived at the pick-up location. In some example embodiments, the GUI 300 comprises a selectable user interface element 360 (e.g., a button configured to be swiped or tapped by the provider 120) configured to, in response to its selection by the provider 120, trigger transmission of a signal to the networked computer system 100 indicating that the provider 120 is starting or has started the transporting of the requester 110 in servicing the request. The networked computer system 100 may use the signal to store the geographical location of the provider 120 (e.g., the GPS coordinates of the client device 122 of the provider 120) as pick-up data for the place indicated as the pick-up location in the request submitted by the requester 110.

Figure 4:
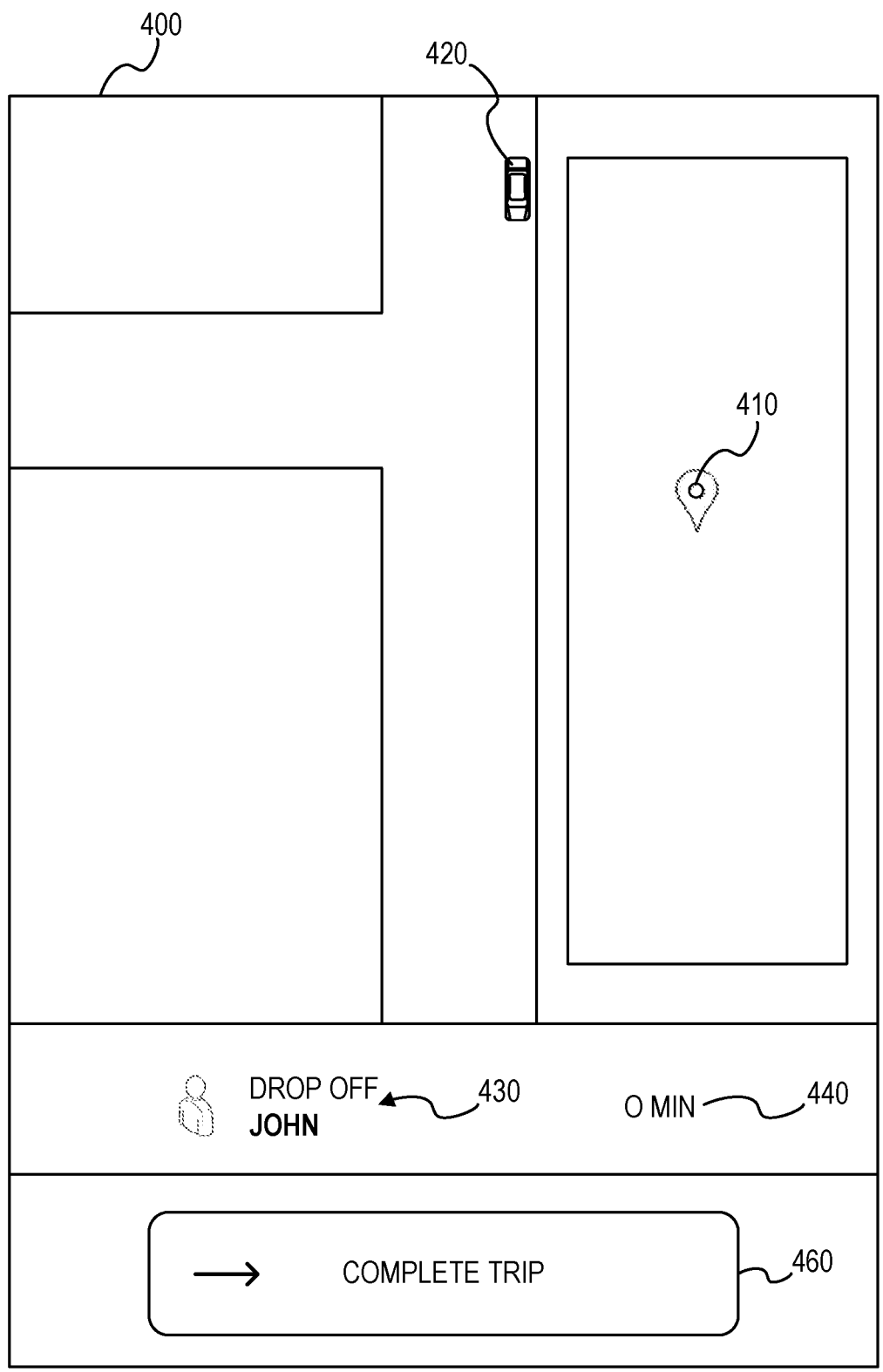
FIG. 4 illustrates a GUI in which the provider of the service may signal that the provider has completed transporting the requester, in accordance with some example embodiments.

FIG. 4 illustrates a GUI 400 in which the provider 120 of the service signals that the provider 120 has completed transporting the requester 110, in accordance with some example embodiments. The GUI 400 may be generated by the provider application 124 and display an indication 410 of the geographical location of the place and an indication 420 of the geographical location of the provider 120 or the client device 122 of the provider 120. The GUI 400 may also display supplemental information, such as an identification 430 of a requester 110 to be dropped off by the provider 120 and an indication 440 of the amount of time until the provider 120 or the client device 122 of the provider 120 arrives at the drop-off location. In some example embodiments, the GUI 400 comprises a selectable user interface element 460 (e.g., a button configured to be swiped or tapped by the provider 120) configured to, in response to its selection by the provider 120, trigger transmission of a signal to the networked computer system 100 indicating that the provider 120 is completing or has completed the transporting of the requester 110 in servicing the request. The networked computer system 100 may use the signal to store the geographical location of the provider 120 (e.g., the GPS coordinates of the client device 122 of the provider 120) as drop-off data for the place indicated as the drop-off location in the request submitted by the requester 110.

In some example embodiments, the pick-up data of the service data corresponds to geographical locations of the client device 112 of the requester 110 when the requester 110 indicates, via the requester application 114 on the client device 112, that the provider 120 has started transporting the requester 110 in servicing a request associated with the place 210 (e.g., the provider 120 has picked up the requester 110 at the place 210). Similarly, in some example embodiments, the drop-off data of the service data corresponds to geographical locations of the client device 112 of the requester 110 when the requester 110 indicates, via the requester application 114 on the client device 112, that the provider 120 has completed transporting the requester 110 in servicing the request associated with the place 210 (e.g., the provider 120 has dropped off the requester 110 at the place 210). The requester 110 may signal that the provider 120 is starting or has started transporting the requester 110 and may signal that the provider 120 is completing or has completed transporting the requester 110 via a selectable user interface element displayed on a GUI via the requester application 114 on the client device 112 of the requester 110, similar to how the provider 120 may signal such service-starting points and service-completing points discussed above.

Referring back to FIG. 1, in some example embodiments, the networked computer system 100 stores satellite image data of a place and service data of the place in association with an identification of the place in the database(s) 108. FIG. 5 illustrates a mapping 500 of corresponding data for different places, in accordance with some example embodiments. This mapping 500 may be stored in the database(s) 108. As seen in FIG. 5, the mapping 500 comprises satellite image data (e.g., IMAGE-1, IMAGE-2, . . . ) and service data (e.g., PICK-UP-1, DROP-OFF-2, DROP-OFF-3, DROP-OFF-4, . . . ) associated with an identifier of the place to which they correspond (e.g., ACME CORP.). In some example embodiments, the mapping 500 also comprises an identification of a category or type of place (e.g., SHOPPING) corresponding to the place.

In some example embodiments, the database(s) 108 also stores, for each place in the plurality of places, a ground truth geographical location of the place. The ground truth geographical location of a place comprises objective data that is used to train and test the deep learning models of the present disclosure. For example, the ground truth geographical location of a place may comprise a geocode entered by an administrator of the networked computer system 100 to represent the most precise geographical location of the place.

Referring back to FIG. 1, in some example embodiments, for each one of a plurality of places, the training module 102 accesses and retrieves the corresponding training data (e.g., the satellite image data, the service data, and the ground truth geographical location) from the database(s) 108, and trains one or more deep learning models based on the training data of the plurality of places. The deep learning model is configured to generate a predicted geographical location (e.g., a geocode) of a place based on satellite image data and service data associated with the place. In some example embodiments, the predicted geographical location of a place comprises a geocode. In some example embodiments, the predicted geographical location of a place comprises an identification of a subsection of the satellite image data of the other place, such as a bounded region within the satellite image data. For example, if the satellite image data comprises a 30-meter by 30-meter region within which the place is positioned, the predicted geographical location of the place may comprise a bounded 10-meter by 10-meter region within that 30-meter by 30-meter region. Such a subsection of the satellite image data may be indicated using a plurality of geocodes indicating the bounded region.

In some example embodiments, the deep learning model is trained using a convolutional neural network (CNN). Examples of CCN's that may be used, in accordance with some example embodiments of the present disclosure, include, but are not limited to, VGG (e.g., VGG-19) and Residual Networks (ResNet). Other types of CNN's may also be employed in accordance with the embodiments of the present disclosure.

In the training phase, the deep learning model can learn that building structures are where the places are located, as opposed to in the middle of a street 220, on a tree 250, or in a body of water 260, using the physical features of those different entities represented in the satellite imagery along with the pick-up data and the drop-off data. In some example embodiments, the deep learning model comprises multiple layers, and the first few layers learn where the edges of entities within the satellite image data are, while the other higher layers of the deep learning model learn that certain edges form certain entities (e.g., these edges form a building, these edges form a tree, these edges form a body of water).

In some example embodiments, the training module 102 breaks up an image of the satellite image data 200 into N-by-N blocks, where N is a positive number (e.g., a positive integer). Each block may be the same size (e.g., each block is 10-meters by 10-meters). The deep learning model learns to identify or recognize a building structure that is in the correct block surrounded by the pick-up locations and drop-off locations. In some example embodiments, the training module 102 trains the deep learning model to predict the geographical location for the correct block (e.g., 10-meter by 10-meter block) of the satellite image data for a place. In some example embodiments, the predicted geographical location of a place comprises a center coordinate (e.g., geocode) for the appropriate block.

Figure 6:
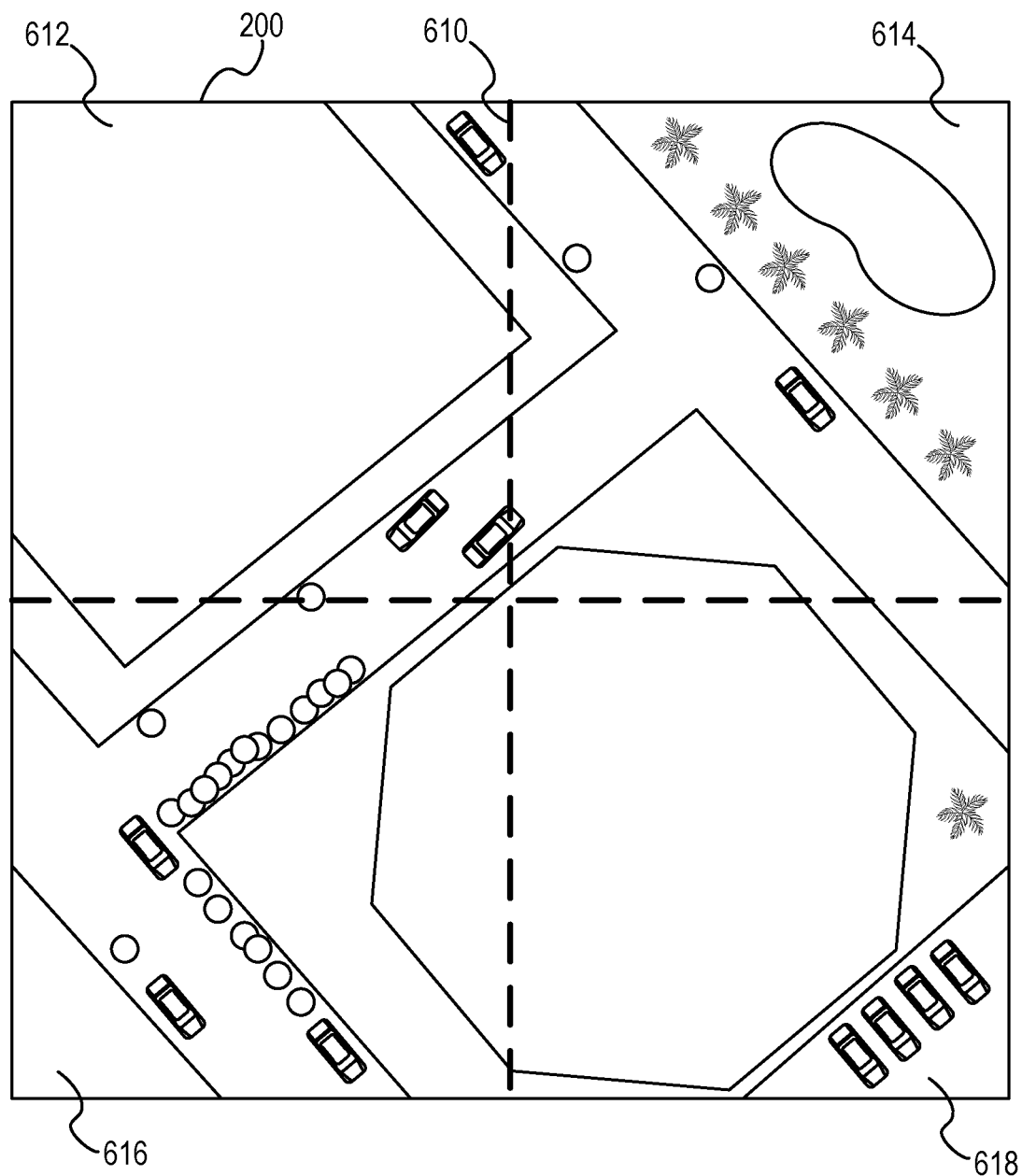
FIG. 6 illustrates satellite image data that is divided into subsections, in accordance with some example embodiments.

In some example embodiments, the predicted geographical location of a place comprises an identification of a subsection of the satellite image data of the place, such as a bounded region within the satellite image data. For example, if the satellite image data comprises a 30-meter by 30-meter region within which the place is positioned, the predicted geographical location of the place may comprise a bounded 10-meter by 10-meter region within that 30-meter by 30-meter region. Such a subsection of the satellite image data may be indicated using a plurality of geocodes indicating the bounded region. FIG. 6 illustrates satellite image data 200 that is divided into subsections, in accordance with some example embodiments. In FIG. 6, dotted lines 610 are shown dividing the satellite image data 200 into four different subsections (e.g., quadrants): a first subsection 612, a second subsection 614, a third subsection 616, and a fourth subsection 618. In the example embodiment shown in FIG. 6, given that the overwhelming amount of service data associated with the place is located within the third subsection 616, the deep learning model predicts that the geographical location of the place is located within the third subsection 616. In some example embodiments, the predicted geographical location of the place in FIG. 6 comprises a center coordinate for the third subsection 616, such as a geocode corresponding to the centroid of the third subsection 616.

In some example embodiments, the training module 102 restricts the use of training data for the training of a deep learning model to training data which comprises a minimum threshold amount of data. For example, the training module 102 may determine that the training data for a place comprises less than a minimum threshold amount of service data, and then prevents this training data from being used in the training of the deep learning model based on this determination. In another example, the training module 102 may determine that the training data for a place comprises more than the minimum threshold amount of service data, and then uses that training data of the place in the training of the deep learning model based on this determination.

Referring back to FIG. 1, in some example embodiments, the prediction module 104 is configured to receive satellite image data and service data for another place not included in the plurality of places on which the deep learning model was trained. The service data for the other place comprises the same type of pick-up data and drop-off data as discussed above for the service data of the plurality of places on which the deep learning model was trained.

In some example embodiments, the prediction module 104 is configured to generate a predicted geographical location of the other place using the deep learning model based on the received satellite image data and the service data for the other place. The prediction module 104 may then store the predicted geographical location of the other place in the database(s) 108 in association with an identification of the other place. For example, the predicted geographical location of the other place may be stored as part of the mapping 500 in FIG. 5. The predicted geographical location of the other place may be stored in association with the corresponding satellite image data and the corresponding service data of the other place. Additionally, an identification of a category or type of place corresponding to the other place may be stored in association with the identification of the other place (or some other identification of the other place).

In some example embodiments, the prediction module 104 generates and stores predicted geographical locations for a plurality of other places in order to build a comprehensive dataset of all places everywhere with accurate names, addresses, and geographical locations. The stored predicted geographical locations may then be used by the networked computer system 100 to provide map data and navigation instructions on the respective client devices 112 and 122 of the requester 110 and the provider 120, as previously discussed above with respect to FIG. 1.

In some example embodiments, the service module 106 is configured to receive, from the client device 112 of the requester 110, a request for a service associated with one of the places for which a predicted geographical location was generated and stored by the prediction module 104 using the deep learning model. The request may comprise an identification of the place, such as a name or an address entered by the requester 110 via the requester application 114 on the client device 112 of the requester 110.

In some example embodiments, the service module 106 identifies the predicted geographical location of the place based on a search of the database(s) 108 using the identification of the place, such as by matching the identification of the place from the request with a corresponding identification of the place in the database(s) 108. The service module 106 may then transmit the predicted geographical location of the place to the client device 122 of the provider 120 of the service of the request and/or to the client device 112 of the requester 110 of the service of the request for use by the provider application 124 and/or the requester application 114 in displaying map data and navigation instructions.

It is contemplated that a technical problem may arise in training a deep learning model in that a single deep learning model may not be sufficiently precise. In order to address this technical problem, in some example embodiments, the training module 102 is configured to train a plurality of deep learning models based on the training data of the plurality of places. The prediction module 104 may then use each one of the plurality of trained deep learning models to generate a corresponding preliminary predicted geographical location for the same place based on the received satellite image data and the service data for a place. The prediction module 104 may then determine the predicted geographical location for the place based on the multiple preliminary predicted geographical locations for the place, thereby reducing the likelihood of inaccuracy that may plague a single deep learning model. In some example embodiments, the prediction module 104 determines the predicted geographical location of the place based on the most common (e.g., the statistical mode) preliminary predicted geographical location amongst the multiple preliminary predicted geographical locations for the place. In other example embodiments, the prediction module 104 determines the predicted geographical location of the place based on an averaging of the multiple preliminary predicted geographical locations.

In some example embodiments, particular deep learning models may be configured for particular categories or types of places, in order to make the coordinate prediction even more precise. In some example embodiments, the training module 102 is configured to identify a category of places to which all of a plurality of places belong, and then select the deep learning model from a plurality of deep learning models for use in the training based on the identifying of the category. In some example embodiments, the prediction module 104 is configured to identify a category or type of places to which a place belongs, and then select the deep learning model for use in the generating of the predicted geographical location of that place based on the identifying of the category or type for that place. For example, the prediction module 104 may search for a deep learning model that is associated with a category or type that matches the category or type of the place.

In some example embodiments, the geographical locations comprise longitude and latitude coordinates. However, it is contemplated that the features of the present disclosure may be used in situations in which altitude is also relevant for navigational purposes. For example, in embodiments where a provider 120 or an automated vehicle (e.g., a drone) is transporting goods to an elevated section of a building (e.g., the tenth floor of an apartment building or an office building), the geographical locations employed by the operations of the present disclosure disclosed herein may comprise longitude, latitude, and altitude coordinates.

Figure 7:
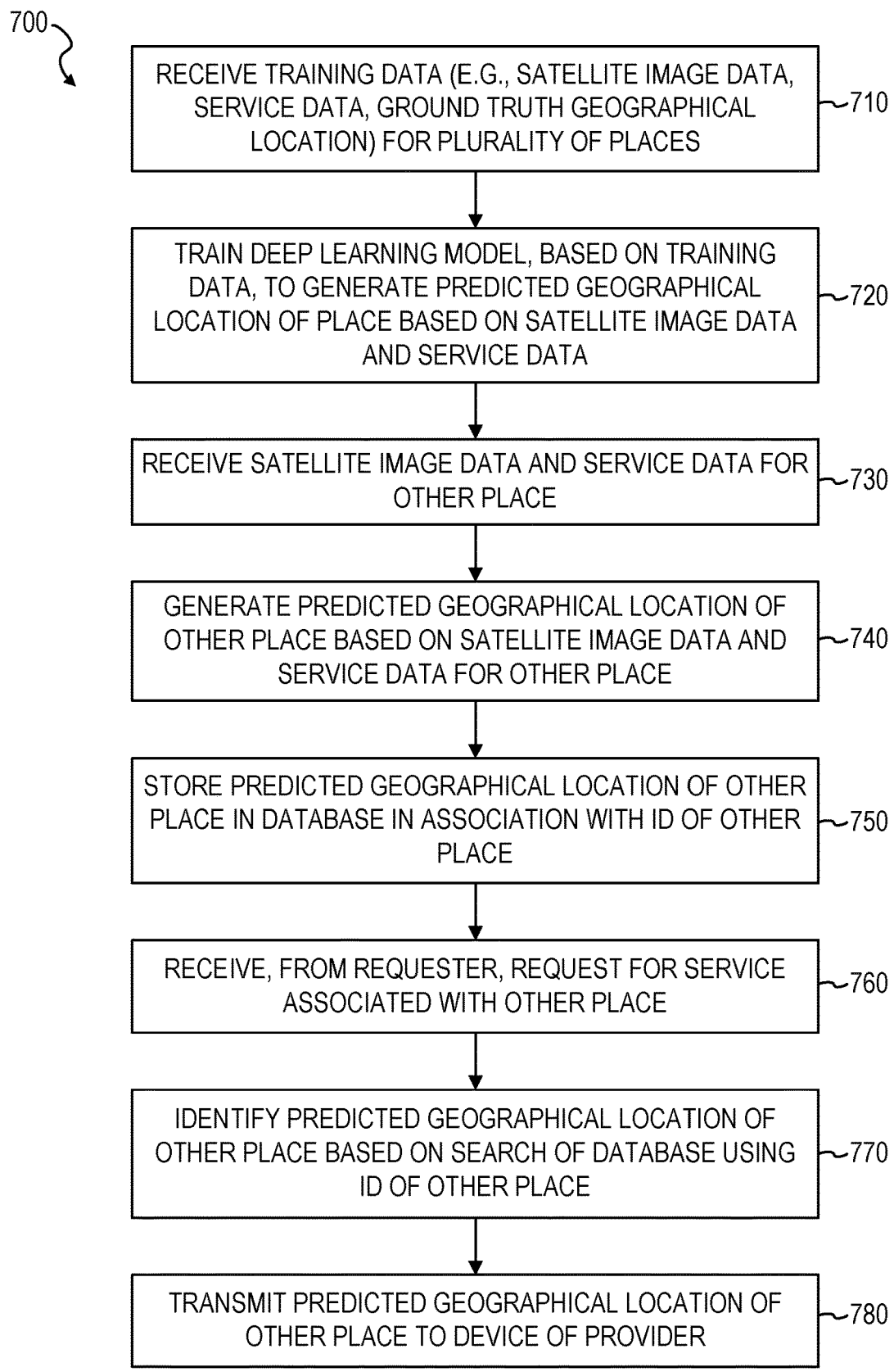
FIG. 7 is a flowchart illustrating a method of deep learning coordinate prediction using satellite image data and service data, in accordance with some example embodiments.

FIG. 7 is a flowchart illustrating a method 700 of deep learning coordinate prediction using satellite image data and service data, in accordance with some example embodiments. The method 700 can be performed by processing logic that can comprise hardware (e.g., circuitry, dedicated logic, programmable logic, microcode, etc.), software (e.g., instructions run on a processing device), or a combination thereof. In one example embodiment, the method 700 is performed by the networked computer system 100 of FIG. 1, or any combination of one or more of its components or modules (e.g., training module 102, prediction module 104, or service module 106), as described above.

At operation 710, the networked computer system 100, for each one of a plurality of places, receives training data associated with the place, the training data comprising satellite image data of the place, service data, and a ground truth geographical location of the place. The service data comprises at least one of pick-up data or drop-off data. The pick-up data indicates a geographical location at which a provider started transporting a requester in servicing a request associated with the place, and the drop-off data indicates a geographical location at which the provider completed transporting the requester in servicing the request associated with the place.

At operation 720, the networked computer system 100 trains a deep learning model based on the training data of the plurality of places. The deep learning model is configured to generate a predicted geographical location of a place based on satellite image data and service data associated with the place.

At operation 730, the networked computer system 100 receives satellite image data and service data for another place not included in the plurality of places from operation 710. The service data for the other place comprises at least one of pick-up data or drop-off data. The pick-up data of the other place indicates a geographical location at which a provider started transporting a requester in servicing a request associated with the other place, and the drop-off data of the other place indicates a geographical location at which the provider completed transporting the requester in servicing the request associated with the other place.

At operation 740, the networked computer system 100 generates a predicted geographical location of the other place using the deep learning model trained in operation 720 and based on the received satellite image data and the service data for the other place.

At operation 750, the networked computer system 100 stores the predicted geographical location of the other place in a database in association with an identification of the other place.

At operation 760, the networked computer system 100 receives a request for a service associated with the other place from a computing device of a requester. The request comprises the identification of the other place.

At operation 770, the networked computer system 100 identifies the predicted geographical location of the other place based on a search of the database using the identification of the other place.

At operation 780, the networked computer system 100 transmits the predicted geographical location of the other place to a computing device of a provider of the service of the request.

It is contemplated that any of the other features described within the present disclosure can be incorporated into the method 700.

Figure 8:
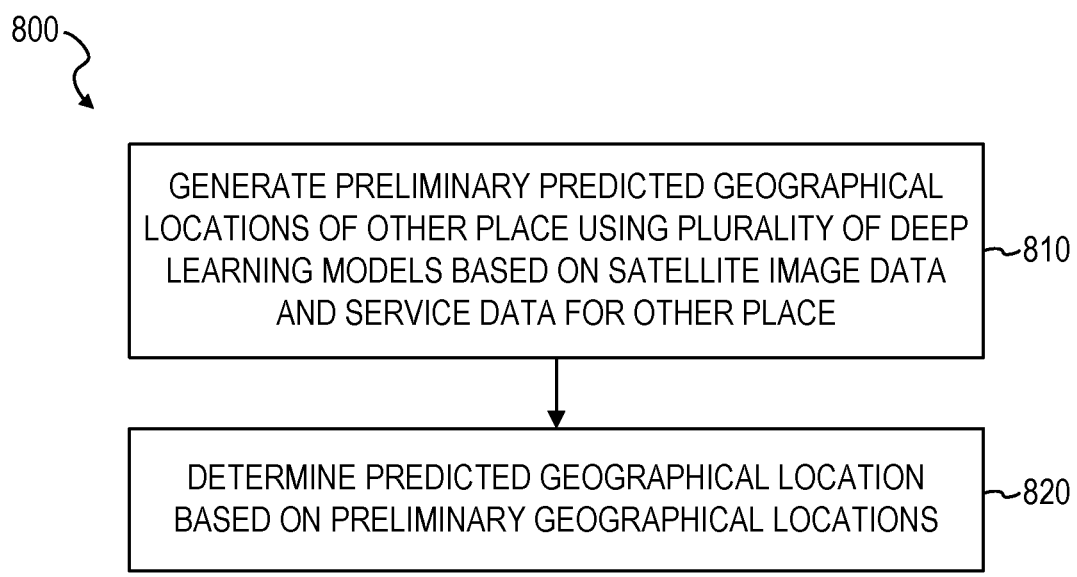
FIG. 8 is a flowchart illustrating a method of generating a predicted geographical location of a place, in accordance with some example embodiments.

FIG. 8 is a flowchart illustrating a method 800 of generating a predicted geographical location of a place, in accordance with some example embodiments. Method 800 corresponds to an embodiment in which the training of the deep learning model at operation 720 in FIG. 7 comprises training a plurality of deep learning models based on the training data of the plurality of places. The operations of method 800 may correspond to the generating of the predicted geographical location at operation 740 in FIG. 7. The method 800 can be performed by processing logic that can comprise hardware (e.g., circuitry, dedicated logic, programmable logic, microcode, etc.), software (e.g., instructions run on a processing device), or a combination thereof. In one example embodiment, the method 800 is performed by the networked computer system 100 of FIG. 1, or any combination of one or more of its components or modules (e.g., training module 102, prediction module 104, or service module 106), as described above.

At operation 810, the networked computer system 100, for each one of the plurality of deep learning models, generates a preliminary predicted geographical location of the other place using the deep learning model based on the received satellite image data and the service data for the other place.

At operation 820, the networked computer system 100 determines the predicted geographical location based on the preliminary predicted geographical locations generated using the plurality of models.

It is contemplated that any of the other features described within the present disclosure can be incorporated into method 800.

Figure 9:
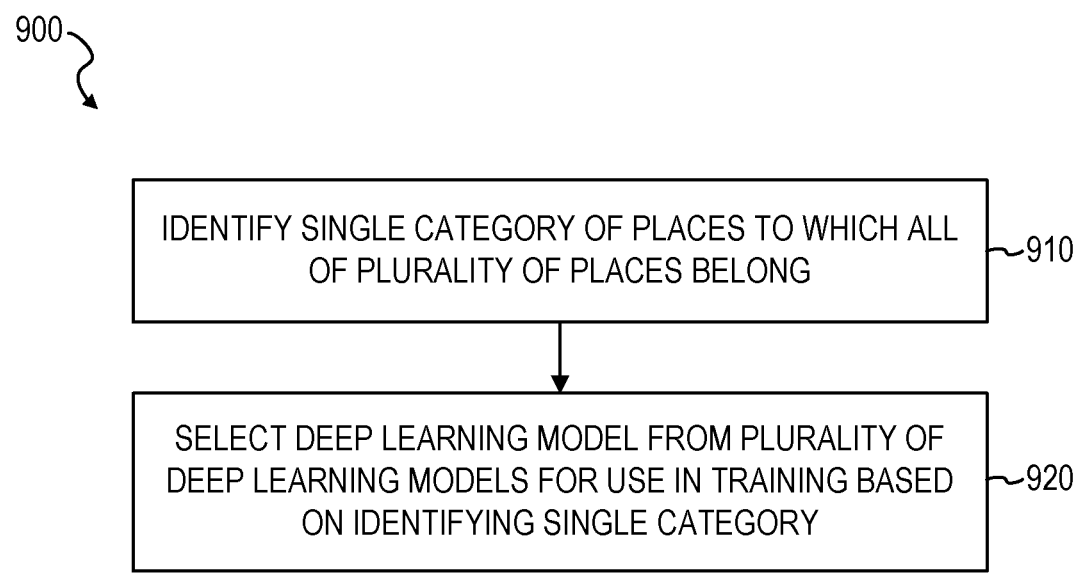
FIG. 9 is a flowchart illustrating a method of selecting a deep learning model to be trained, in accordance with some example embodiments.

FIG. 9 is a flowchart illustrating a method 900 of selecting a deep learning model to be trained, in accordance with some example embodiments. The method 900 can be performed by processing logic that can comprise hardware (e.g., circuitry, dedicated logic, programmable logic, microcode, etc.), software (e.g., instructions run on a processing device), or a combination thereof. In one example embodiment, the method 900 is performed by the networked computer system 100 of FIG. 1, or any combination of one or more of its components or modules (e.g., training module 102, prediction module 104, or service module 106), as described above.

At operation 910, the networked computer system 100 identifies a single category of places to which all of the plurality of places belong. At operation 920, the networked computer system 100 selects the deep learning model from a plurality of deep learning models for use in the training of the deep learning model based on the identifying of the single category.

It is contemplated that any of the other features described within the present disclosure can be incorporated into the method 900.

Figure 10:
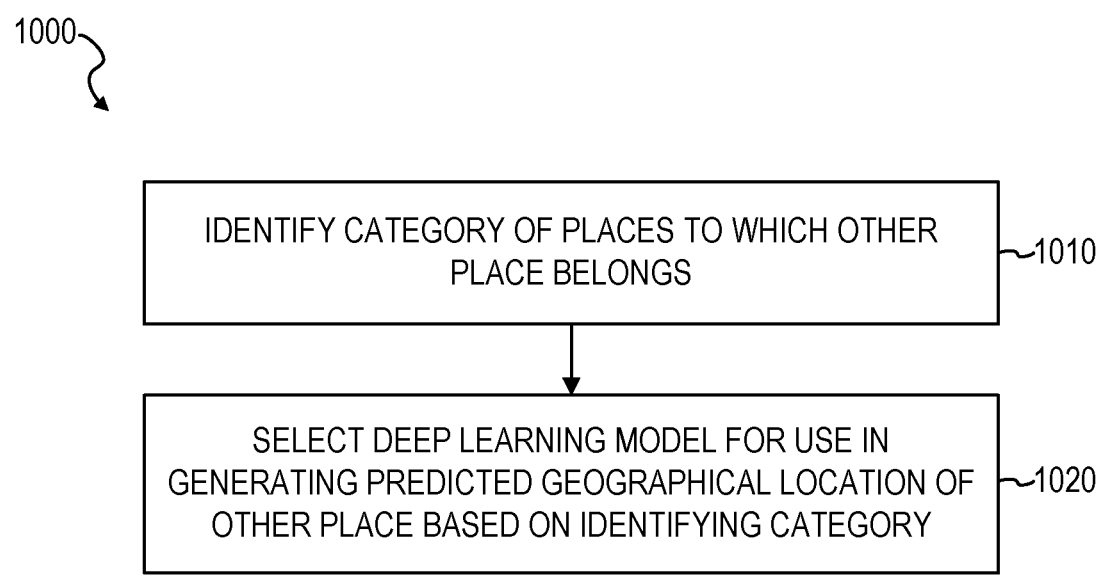
FIG. 10 is a flowchart illustrating a method of selecting a deep learning model for use in generating a predicted geographical location of a place, in accordance with some example embodiments.

FIG. 10 is a flowchart illustrating a method 1000 of selecting a deep learning model for use in generating a predicted geographical location of a place, in accordance with some example embodiments. The method 1000 can be performed by processing logic that can comprise hardware (e.g., circuitry, dedicated logic, programmable logic, microcode, etc.), software (e.g., instructions run on a processing device), or a combination thereof. In one example embodiment, the method 1000 is performed by the networked computer system 100 of FIG. 1, or any combination of one or more of its components or modules (e.g., training module 102, prediction module 104, or service module 106), as described above.

At operation 1010, the networked computer system 100 identifies a category of places to which the other place belongs. At operation 1020, the networked computer system 100 selects the deep learning model for use in the generating of the predicted geographical location of the other place based on the identifying of the category.

It is contemplated that any of the other features described within the present disclosure can be incorporated into the method 1000.

It is contemplated that any features of any embodiments disclosed herein can be combined with any other features of any other embodiments disclosed herein. Accordingly, any such hybrid embodiments are within the scope of the present disclosure.

EXAMPLE MOBILE DEVICE

Figure 11:
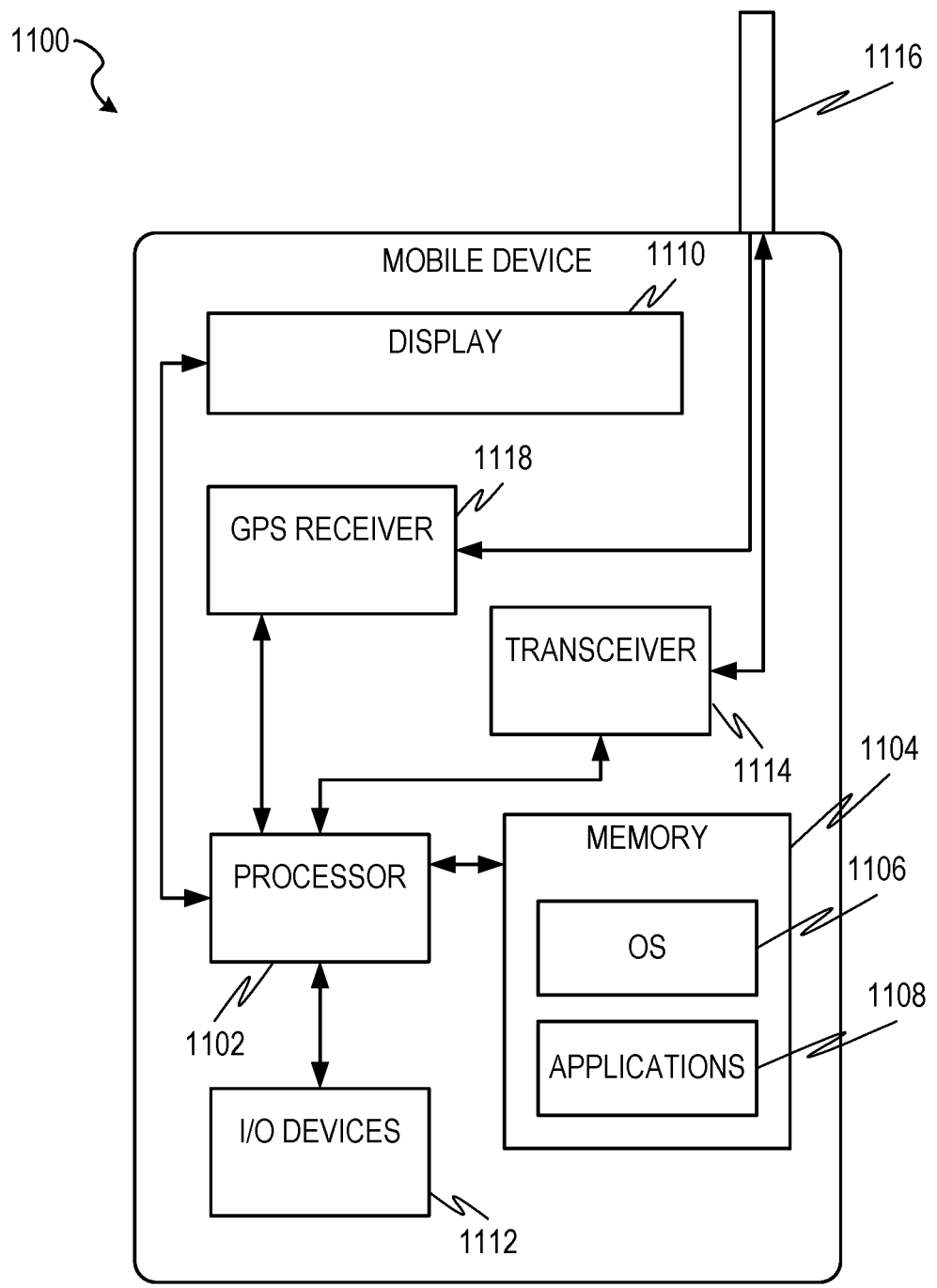
FIG. 11 is a block diagram illustrating a mobile device, in accordance with some example embodiments.

FIG. 11 is a block diagram illustrating a mobile device 1100, according to an example embodiment. The mobile device 1100 can include a processor 1102. The processor 1102 can be any of a variety of different types of commercially available processors suitable for mobile devices 1100 (for example, an XScale architecture microprocessor, a Microprocessor without Interlocked Pipeline Stages (MIPS) architecture processor, or another type of processor). A memory 1104, such as a random access memory (RAM), a Flash memory, or other type of memory, is typically accessible to the processor 1102. The memory 1104 can be adapted to store an operating system (OS) 1106, as well as application programs 1108, such as a mobile location-enabled application that can provide location-based services (LBSs) to a user. The processor 1102 can be coupled, either directly or via appropriate intermediary hardware, to a display 1110 and to one or more input/output (I/O) devices 1112, such as a keypad, a touch panel sensor, a microphone, and the like. Similarly, in some embodiments, the processor 1102 can be coupled to a transceiver 1114 that interfaces with an antenna 1116. The transceiver 1114 can be configured to both transmit and receive cellular network signals, wireless data signals, or other types of signals via the antenna 1116, depending on the nature of the mobile device 1100. Further, in some configurations, a GPS receiver 1118 can also make use of the antenna 1116 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a processor configured using software, the processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Programming Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

EXAMPLE MACHINE ARCHITECTURE

Figure 12:
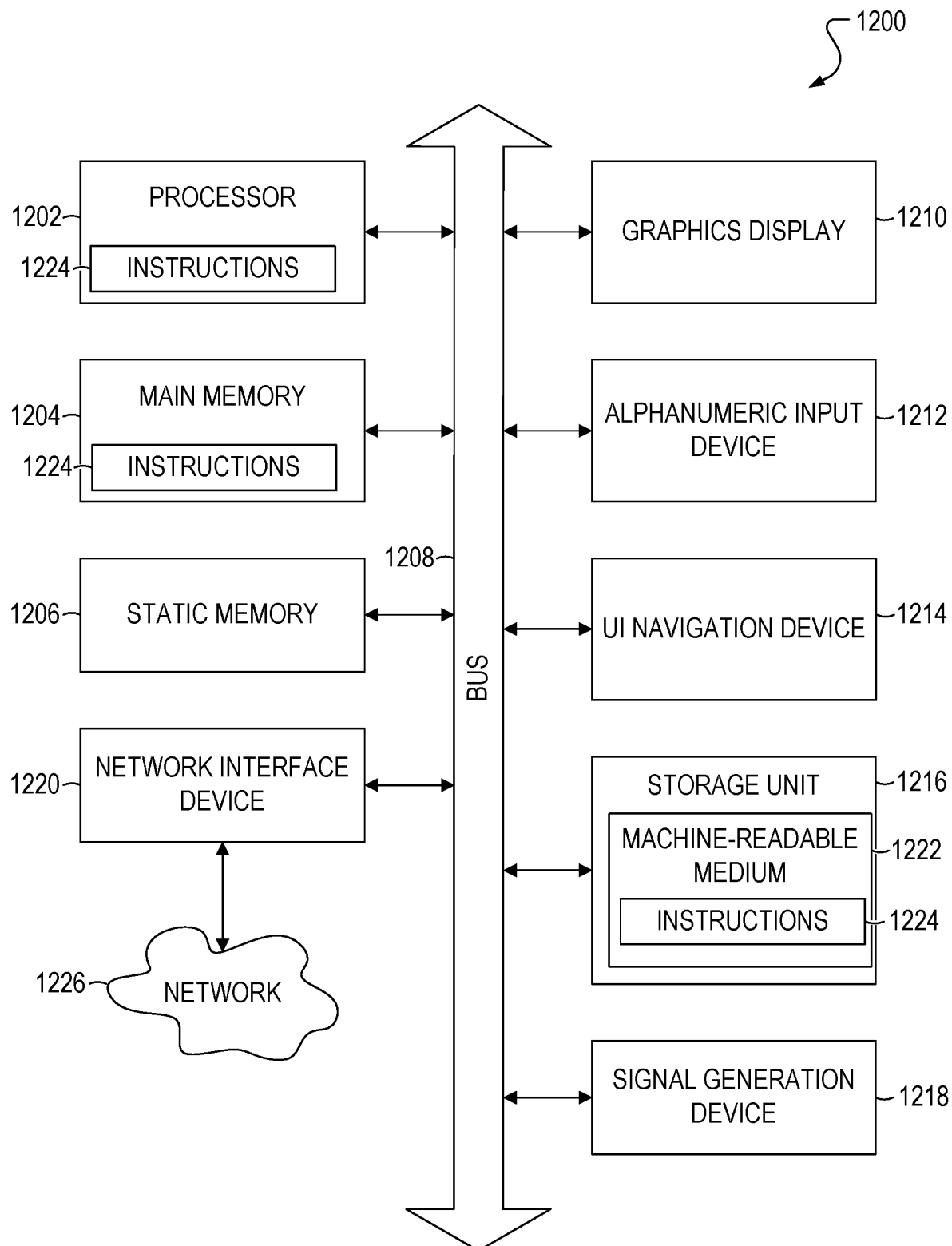
FIG. 12 is a diagrammatic representation of a machine in the form of a computer system within which a set of instructions may be executed for causing the machine to perform any one or more of the methodologies discussed herein, according to an example embodiment.

FIG. 12 is a block diagram of an example computer system 1200 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a graphics display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation device 1214 (e.g., a mouse), a storage unit 1216, a signal generation device 1218 (e.g., a speaker) and a network interface device 1220.

Machine-Readable Medium

The storage unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions (e.g., the instructions 1224) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Executable Instructions and Machine-Storage Medium

The various memories (i.e., 1204, 1206, and/p or memory of the processor(s) 1202) and/or storage unit 1216 may store one or more sets of instructions and data structures (e.g., software) 1224 embodying or utilized by any one or more of the methodologies or functions described herein. These instructions, when executed by processor(s) 1202 cause various operations to implement the disclosed embodiments.

As used herein, the terms "machine-storage medium," "device-storage medium," "computer-storage medium" (referred to collectively as "machine-storage medium 1222") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1222 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1222 specifically exclude carrier waves, modulated data signals, and other such media, at least some of which are covered under the term "signal medium" discussed below.

Signal Medium

The term "signal medium" or "transmission medium" in this disclosure shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

NUMBERED EXAMPLES OF EMBODIMENTS

The following numbered examples are embodiments.
1. A Computer-implemented method comprising:
for each one of a plurality of places, receiving training data associated with the place, the training data comprising satellite image data of the place, service data, and a ground truth geographical location of the place, the service data comprising at least one of pick-up data and drop-off data, the pick-up data indicating a geographical location at which a provider started transporting a requester in servicing a request associated with the place, the drop-off data indicating a geographical location at which the provider completed transporting the requester in servicing the request associated with the place;
training a deep learning model based on the training data of the plurality of places, the deep leaning model configured to generate a predicted geographical location of a place based on satellite image data and service data associated with the place;
receiving satellite image data and service data for another place not included in the plurality of places, the service data for the other place comprising at least one of pick-up data and drop-off data, the pick-up data of the other place indicating a geographical location at which a provider started transporting a requester in servicing a request associated with the other place, the drop-off data of the other place indicating a geographical location at which the provider completed transporting the requester in servicing a request associated with the other place; and generating a predicted geographical location of the other place using the deep learning model based on the received satellite image data and the service data for the other place.

2. The computer-implemented method of example 2, further comprising:

storing the predicted geographical location of the other place in a database in association with an identification of the other place;

receiving a request for a service associated with the other place from a computing device of a requester, the request comprising the identification of the other place;

identifying the predicted geographical location of the other place based on a search of the database using the identification of the other place; and transmitting the predicted geographical location of the other place to a computing device of a provider of the service of the request.

3. The computer-implemented method of example 1 or example 2, wherein the service data of the training data comprises a geocode, the service data for the other place comprises a geocode, and the predicted geographical location of the other place comprises a geocode.

4. The computer-implemented method of any one of examples 1 to 3, wherein the deep learning model is trained using a convolutional neural network.

5. The computer-implemented method of any one of examples 1 to 4, wherein the service data of the training data comprises global positioning system (GPS) data of a mobile device of the provider corresponding to the request corresponding to the service data of the training data, and the service data for the other place comprises GPS data of a mobile device of the provider corresponding to the request corresponding to the service data for the other place.

6. The computer-implemented method of any one of examples 1 to 5, wherein the predicted geographical location of the other place comprises a subsection of the satellite image data of the other place.

7. The computer-implemented method of any one of examples 1 to 6, wherein the training of the deep learning model comprises:

for each one of the plurality of places, generating integrated data by superimposing indications of the corresponding service data on the corresponding satellite image data; and training the deep learning model using the integrated data.

8. The computer-implemented method of any one of examples 1 to 7, wherein the training of the deep learning model comprises, for each one of the plurality of places, passing the corresponding satellite image data to the deep learning model separately from the corresponding service data.

9. The computer-implemented method of any one of examples 1 to 8, wherein the training of the deep learning model comprises training a plurality of deep learning models based on the training data of the plurality of places, and the generating the predicted geographical location of the other place comprises:

for each one of the plurality of deep learning models, generating a preliminary predicted geographical location of the other place using the one of the deep learning model based on the received satellite image data and the service data for the other place; and determining the predicted geographical location based on the preliminary predicted geographical locations generated using the plurality of models.

10. The computer-implemented method of any one of examples 1 to 9, wherein the determining the predicted geographical location comprises selecting the preliminary predicted geographical location that is most common among the preliminary predicted geographical locations generated using the plurality of models.

11. The computer-implemented method of any one of examples 1 to 10, wherein the determining the predicted geographical location comprises determining an average of the preliminary predicted geographical locations generated using the plurality of models.

12. The computer-implemented method of any one of examples 1 to 11, further comprising:

identifying a single category of places to which all of the plurality of places belong; and selecting the deep learning model from a plurality of deep learning models for use in the training of the deep learning model based on the identifying of the single category.

13. The computer-implemented method of any one of examples 1 to 12, further comprising:

identifying a category of places to which the other place belongs; and selecting the deep learning model for use in the generating of the predicted geographical location of the other place based on the identifying of the category.

14. The computer-implemented method of any one of examples 1 to 13, wherein, for each one of the plurality of places, the use of the training data of the place in the training of the deep learning model is based on a determination that an amount of the service data of the training data of the place satisfies a minimum threshold amount.

15. A system comprising:

at least one hardware processor; and a machine-readable medium embodying a set of instructions that, when executed by the at least one hardware processor, cause the at least one hardware processor to perform the method of any one of examples 1 to 14.

16. A machine-readable medium embodying a set of instructions that, when executed by the at least one hardware processor, cause the at least one hardware processor to perform the method of any one of examples 1 to 14.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
for each one of a plurality of places, receiving, by a computer system having at least one hardware processor, training data associated with the place of the plurality of places, the training data comprising satellite image data of the place, service data, and a ground truth geographical location of the place, the service data comprising at least one of pick-up data or drop-off data, the pick-up data indicating a geographical location at which a provider started transporting a requester in servicing a request associated with the place, the drop-off data indicating a geographical location at which the provider completed transporting the requester in servicing the request associated with the place;
training, by the computer system, a deep learning model based on the training data of the plurality of places, the deep learning model configured to generate a predicted geographical location of another place based on satellite image data and service data associated with the other place;
receiving, by the computer system, satellite image data and service data for the other place not included in the plurality of places, the service data for the other place comprising at least one of pick-up data or drop-off data of the other place, the pick-up data of the other place indicating a geographical location at which another provider started transporting another requester in servicing another request associated with the other place, the drop-off data of the other place indicating a geographical location at which the other provider completed transporting the other requester in servicing the other request associated with the other place; and
generating, by the computer system, the predicted geographical location of the other place using the deep learning model based on the received satellite image data and the service data for the other place.

2. The computer-implemented method of claim 1, further comprising:
storing, by the computer system, the predicted geographical location of the other place in a database in association with an identification of the other place;
receiving, by the computer system, a third request for a service associated with the other place from a computing device of a third requester, the third request comprising the identification of the other place;
identifying, by the computer system, the predicted geographical location of the other place based on a search of the database using the identification of the other place; and
transmitting, by the computer system, the predicted geographical location of the other place to a computing device of a third provider of the service of the third request.

3. The computer-implemented method of claim 1, wherein the service data of the training data comprises a geocode, the service data for the other place comprises a geocode, and the predicted geographical location of the other place comprises a geocode.

4. The computer-implemented method of claim 1, wherein the deep learning model is trained using a convolutional neural network.

5. The computer-implemented method of claim 1, wherein the service data of the training data comprises global positioning system (GPS) data of a mobile device of the provider corresponding to the request corresponding to the service data of the training data; and the service data for the other place comprises GPS data of a mobile device of the other provider corresponding to the other request corresponding to the service data for the other place.

6. The computer-implemented method of claim 1, wherein the predicted geographical location of the other place comprises a subsection of the satellite image data of the other place.

7. The computer-implemented method of claim 1, wherein the training of the deep learning model comprises:
for each one of the plurality of places, generating integrated data by superimposing indications of the corresponding service data on the corresponding satellite image data; and
training the deep learning model using the integrated data.

8. The computer-implemented method of claim 1, wherein the training of the deep learning model comprises, for each one of the plurality of places, passing the corresponding satellite image data to the deep learning model separately from the corresponding service data.

9. The computer-implemented method of claim 1, wherein the training of the deep learning model comprises training a plurality of deep learning models based on the training data of the plurality of places, and the generating the predicted geographical location of the other place comprises:
for each one of the plurality of deep learning models, generating a preliminary predicted geographical location of the other place using the one of the deep learning models based on the received satellite image data and the service data for the other place; and
determining the predicted geographical location based on the preliminary predicted geographical locations generated using the plurality of deep learning models.

10. The computer-implemented method of claim 9, wherein the determining the predicted geographical location comprises selecting the preliminary predicted geographical location that is most common among the preliminary predicted geographical locations generated using the plurality of deep learning models.

11. The computer-implemented method of claim 9, wherein the determining the predicted geographical location comprises determining an average of the preliminary predicted geographical locations generated using the plurality of deep learning models.

12. The computer-implemented method of claim 1, further comprising:
identifying a single category of places to which all of the plurality of places belong; and
selecting the deep learning model from a plurality of deep learning models for use in the training of the deep learning model based on the identifying of the single category.

13. The computer-implemented method of claim 1, further comprising:
identifying a category of places to which the other place belongs; and
selecting the deep learning model for use in the generating of the predicted geographical location of the other place based on the identifying of the category.

14. The computer-implemented method of claim 1, wherein, for each one of the plurality of places, the use of the training data of the place in the training of the deep learning model is based on a determination that an amount of the service data of the training data of the place satisfies a minimum threshold amount.

15. A system comprising:

at least one hardware processor; and a non-transitory machine-storage medium embodying a set of instructions that, when executed by the at least one hardware processor, cause the at least one hardware processor to perform operations, the operations comprising:

for each one of a plurality of places, receiving training data associated with the place of the plurality of places, the training data comprising satellite image data of the place, service data, and a ground truth geographical location of the place, the service data comprising at least one of pick-up data or drop-off data, the pick-up data indicating a geographical location at which a provider started transporting a requester in servicing a request associated with the place, the drop-off data indicating a geographical location at which the provider completed transporting the requester in servicing the request associated with the place;

training a deep learning model based on the training data of the plurality of places, the deep learning model configured to generate a predicted geographical location of another place based on satellite image data and service data associated with the other place;

receiving satellite image data and service data for the other place not included in the plurality of places, the service data for the other place comprising at least one of pick-up data or drop-off data of the other place, the pick-up data of the other place indicating a geographical location at which another provider started transporting a another requester in servicing another request associated with the other place, the drop-off data of the other place indicating a geographical location at which the other provider completed transporting the other requester in servicing the other request associated with the other place; and generating the predicted geographical location of the other place using the deep learning model based on the received satellite image data and the service data for the other place.

16. The system of claim 15, wherein the operations further comprise storing the predicted geographical location of the other place in a database in association with an identification of the other place.

17. The system of claim 16, wherein the operations further comprise:

receiving a third request for a service associated with the other place from a computing device of a third requester, the third request comprising the identification of the other place;

identifying the predicted geographical location of the other place based on a search of the database using the identification of the other place; and transmitting the predicted geographical location of the other place to a computing device of a third provider of the service of the third request.

18. The system of claim 15, wherein the service data of the training data comprises a geocode, the service data for the other place comprises a geocode, and the predicted geographical location of the other place comprises a geocode.

19. The system of claim 15, wherein the deep learning model is trained using a convolutional neural network.

20. A non-transitory machine-storage medium embodying a set of instructions that, when executed by at least one hardware processor, cause the at least one hardware processor to perform operations, the operations comprising:

for each one of a plurality of places, receiving training data associated with the place, the training data comprising satellite image data of the place, service data, and a ground truth geographical location of the place, the service data comprising at least one of pick-up data and drop-off data, the pick-up data indicating a geographical location at which a provider started transporting a requester in servicing a request associated with the place, the drop-off data indicating a geographical location at which the provider completed transporting the requester in servicing the request associated with the place;

training a deep learning model based on the training data of the plurality of places, the deep learning model configured to generate a predicted geographical location of a place based on satellite image data and service data associated with the place;

receiving satellite image data and service data for another place not included in the plurality of places, the service data for the other place comprising at least one of pick-up data and drop-off data, the pick-up data of the other place indicating a geographical location at which a provider started transporting a requester in servicing a request associated with the other place, the drop-off data of the other place indicating a geographical location at which the provider completed transporting the requester in servicing the request associated with the other place; and generating a predicted geographical location of the other place using the deep learning model based on the received satellite image data and the service data for the other place.

* * * * *